No. 794,673. PATENTED JULY 11, 1905.
T. C. KING.
METHOD OR PROCESS OF PURIFYING AND NODULIZING METALLIFEROUS MATERIALS.
APPLICATION FILED NOV. 14, 1904.
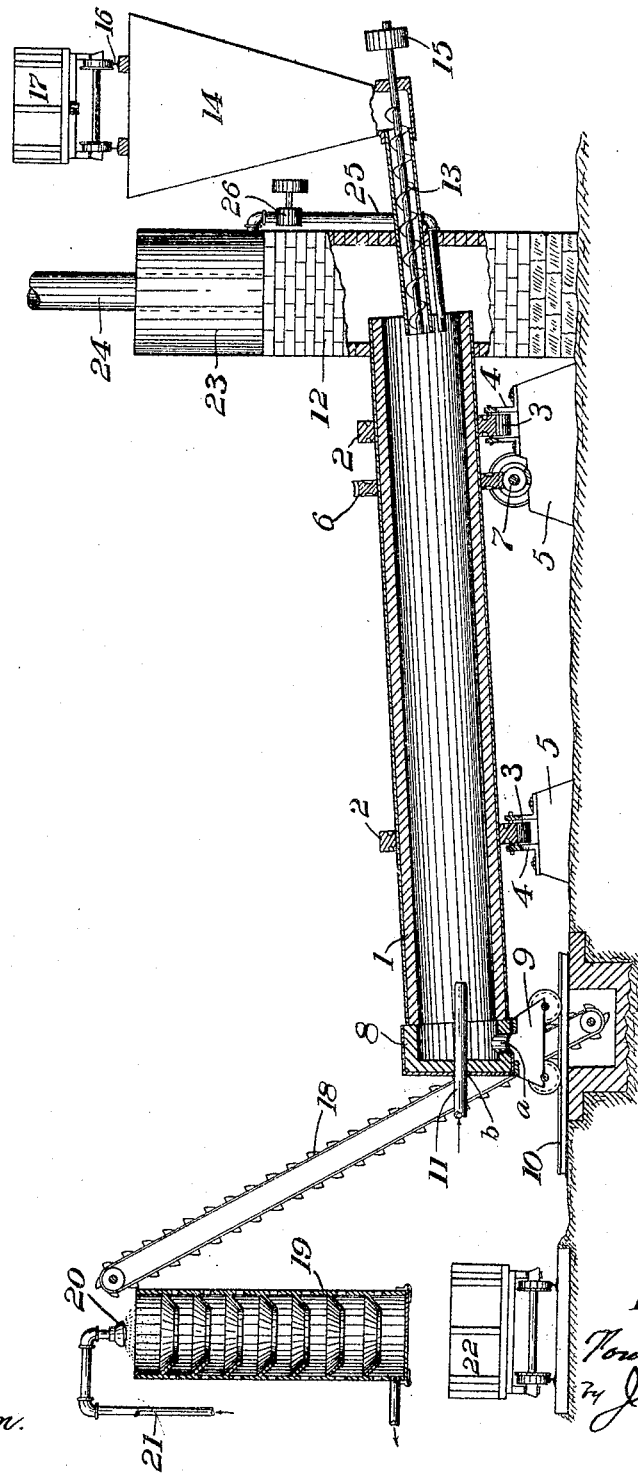
Witnesses;
C. A. Williams
James E. Herron.
Inventor,
Thos Cobb King
by John H. Honey
his Atty.

No. 794,673. Patented July 11, 1905.

UNITED STATES PATENT OFFICE.

TOM COBB KING, OF MARION, ALABAMA, ASSIGNOR TO NATIONAL METALLURGIC COMPANY, OF JERSEY CITY, NEW JERSEY, A CORPORATION OF NEW JERSEY.

METHOD OR PROCESS OF PURIFYING AND NODULIZING METALLIFEROUS MATERIALS.

SPECIFICATION forming part of Letters Patent No. 794,673, dated July 11, 1905.

Application filed November 14, 1904. Serial No. 232,555.

*To all whom it may concern:*

Be it known that I, TOM COBB KING, a citizen of the United States, residing at Marion, in the county of Perry and State of Alabama, have discovered or invented a new and useful Improvement in Methods or Processes of Purifying and Nodulizing Metalliferous Materials, of which improvement the following is a specification.

My invention or discovery relates to methods or processes of preparing and treating metallic oxids, carbonates, and ores preparatory to use in furnaces and also relates to the treatment of the oxid of iron commonly called "flue-dust."

The hereinafter-described method or process, while applicable to the treatment of all forms of metallic oxids, carbonates, and ores, can be used with very great advantage in the treatment of by-products obtained from the manufacture of sulfuric acid from pyrites of iron, commonly called "pyritic cinder," which, mainly because of the quantity of sulfur contained therein and its injurious effect upon the iron produced, have hitherto not been commercially utilized in the manufacture of this metal, and hence have accumulated in large quantities.

The pyritic cinder contains a percentum of sulfur so high as to practically preclude its use in blast-furnace and open-hearth practice, and this may be the case with other metallic oxids. Consequently the oxids containing sulfur of such percentage must be desulfurized before the same can be utilized in blast-furnace and open-hearth practice.

Various attempts have been heretofore made to practically utilize substances of the character above described or some of them by means of mixing them with certain classes of materials which are known as "binders" and then manipulating the material in what is known as a "rotary" kiln or by briqueting, with a view of ultimately forming the same into nodules or briquets. All of these processes have been found more or less unsatisfactory in practice, for the reason that persons employing such processes have uniformly failed to make use of a suitable material as a binder and have invariably used binders that have increased the impurities in the mass instead of aiding in the elimination of the same.

Now I have discovered that the use of a binder, preferably reducing in character and adhesive at low temperatures—*i. e.*, approximately below 600° Fahrenheit and volatile at a fairly moderate temperature—which has an affinity for and is capable of forming volatile compounds with such impurities as sulfur, arsenic, &c., and is with such impurities gradually volatilized or burned out, not only substantially eliminates all the impurities from the metalliferous materials, but also when treated as herein specified forms or converts said material into nodules of any desired size substantially anhydrous in character. By using such a binder the particles of the metalliferous material treated are initially cohered and aided to fuse almost perfectly into nodules instead of large masses, the size of the nodules being regulated by the character and quantity of adhesive binder used and the rapidity of agitation or movement of the material in the apparatus or kiln and the temperature of heat to which the mixture is subjected. Furthermore, by reason of the volatile or combustible character of the adhesive material the binder will practically be eliminated from the nodules produced, which are solidified by partial fusion. For the purposes of bringing about these results I employ any adhesive substance, as hydrocarbon or carbohydrate compounds—such as tar, pitch, asphalt, petroleum residuums, dextrine, molasses, glucose, &c.—which are capable of being made liquid or plastic at comparatively low temperatures and which produce the desired results and are readily obtainable in cheap and available form.

I am aware that bituminous coal or other solid non-fusible carbonaceous material has been mixed with metalliferous material for the purpose of producing therefrom, by ignition, a metalliferous coke; but the product resulting from such mixture is not a pure partially-fused nodule, but an impure coke-like body containing more or less carbonaceous material, for the reason that a considerable proportion of coal must be used, thereby increasing the expense of production and the percentage of impurities in the product.

My invention therefore consists, primarily, in practically eliminating the impurities aforesaid contained in metalliferous materials during the operation of nodulizing the same, and, secondly, in employing for this purpose a binder which will initially cohere the material being acted upon at low temperatures and will aid in the removal of such impurities and at the same time ultimately be eliminated when the operation is complete.

In the practice of my invention I take the before-mentioned metallic oxides, carbonates, flue-dust, pyritic cinder, and ores and, if necessary, break the same into suitable sizes or fineness, as required, and add thereto a quantity of an adhesive substance having the characteristics above specified, the quantity of the adhesive substance added to the ores, oxides, or carbonates under treatment being regulated by the amount of adhesiveness desired.

In the lower zones of heat in the apparatus or kiln the materials are cohered by the adhesiveness of the pitch or other adhesive substance used as a binder until, by agitation in any suitable manner, the materials are formed into nodules, which are carried by the agitation or other suitable movement into and through the zones of incipient fusion, 2,000° Fahrenheit and upward, and thereby rendered permanently cohesive and in condition for discharge from the apparatus or kiln.

The size of the nodules can be varied and regulated by varying the quantity and quality of the adhesive binder substance and the temperatures of heat and rapidity of agitation or movement of the material. I have found in practice that the addition of one per cent. (1%) of pitch to ninety-nine per cent. (99%) of an iron oxid analyzing sixty-seven per cent. (67%) iron and one per cent. (1%) silica produces nodules about the size of a goose-egg, which size is best adapted for open-hearth practice, and that one-half per cent. ($\frac{1}{2}$%) of pitch added to ninety-nine and one-half per cent. ($99\frac{1}{2}$%) of this same ore produces nodules the size of a partridge-egg—the size best adapted to blast-furnace practice—the same conditions as to temperatures and rapidity of agitation or movement of the material being observed.

The advantages gained by the use of an adhesive substance as a binder having the characteristics above specified are as follows:

First. The easy method of distributing the adhesive substance at low temperatures through the material to be nodulized—as, for instance, by spraying.

Second. The small percentage of adhesive substance used does not take up valuable space in the kiln or other apparatus employed nor does it introduce foreign or extraneous matter in appreciable quantities.

Third. The adhesive binders employed are removable from the mass and do not remain fixed or permanent and are temporary in their effect only, as their action is to purify and size the nodules, so that fusion may readily begin to take place and the purified particles of metalliferous material be permanently bound together, thereby producing nodules consisting, essentially, of metalliferous units only.

Fourth. The adhesive substance used in addition to its function as a binder acts as a fuel.

Fifth. The adhesive substance used as a binder differs from those heretofore employed—such as a sodium compound, like salt, a calcium compound, like lime, a magnesia compound, like dolomite, a silicate of lime and alumina, or a silicate of lime, magnesia, and alumina, like a slag—inasmuch as (a) the adhesive substance used is not relied upon to permanently bind the particles of metalliferous material together, but is only used as an agent to initially bind, aid fusion, and finally produce permanent coherent nodules of the desired size and containing substantially no fixed foreign compounds, while the use of the above-mentioned binders—such as salt, lime, dolomite, and slag—are relied upon to permanently bind, and consequently form a fixed foreign compound with the mass; (b) the chemical character of the adhesive substances employed by me aid in the removal of impurities, such as sulfur, which consequently do not remain fixed in the nodules, while the binders above enumerated, on the contrary, form more or less permanent or stable compounds with sulfur and other impurities and hold the same in the nodules; (c) adhesive substances such as I employ do not act upon or destroy the lining of the apparatus employed, as is the case with compounds such as salt, which are used as binders, which in most instances have an injurious effect upon the lining of the apparatus.

Sixth. The quantity and quality of the adhesive substance used aids in regulating not only the size, but more especially the uniformity in character, of the nodules obtained, for the reason that the constituents of such adhesive substance are gradually and progressively volatilized or removed by combustion as the temperature of heat is increased, and large masses consequently break up into smaller, which are more readily rendered coherent by incipient fusion.

Seventh. The nature of the binder used in conjunction with the temperature of heat expels all moisture, is such that the nodule formed is of such nature that it will not take up further moisture, and hence forms a very concentrated product easily transportable and which upon being smelted in a furnace does not require as much fuel and blast as it would if moisture had remained in it, and hence its use in practice increases the capacity of the furnace and lessens fuel per ton of product produced.

Eighth. In contradistinction to the great majority of ores now used in the manufacture of pig-iron the nodules are so formed that they operate to hold up the burden or superincumbent mass in the blast-furnace and do not become pulverulent or powdered, and thus prevent slips, explosions, and irregular working of the furnace, which are so expensive and annoying in practice.

To finally summarize, my invention differs from those heretofore employed, for the reason that I do not rely upon the adhesive substance to permanently bind the particles of metalliferous material, but use the same as an agent to initially bind, aid fusion, purify, size, and finally produce with the aid of heat and agitation or movement permanently-coherent nodules of the desired size and substantially free from fixed foreign compounds. In other words, the binders I employ have a two-fold action—primarily, to regulate the size of the nodules, so that they may enter the zone of fusion in a proper shape and condition to be readily acted upon, and, secondly, after having performed this function to aid in the purification of the metalliferous material by combining with the impurities therein, forming volatile products, or reacts thereon and in conjunction with the binder itself are eliminated from the nodules by heat.

In the accompanying drawing, I show a diagrammatic view of an apparatus or plant adapted to carry out my method or process in which the rotary kiln is shown in section.

Referring to the drawing, 1 indicates a cylindrical retort or kiln the interior of which is lined with fire-brick or other refractory material. The retort is provided with a number of tires 2, 2, which are riveted or otherwise suitably secured upon the exterior thereof and are adapted to operate upon the trunnions 3 3, which are journaled in bearings formed in the brackets or supports 4 4, the said supports being secured upon the piers 5 5. The said retort is also provided with a large cog-wheel 6, which is suitably secured upon the exterior thereof and meshes with and receives power from the worm-shaft 7, which is driven by any suitable power. One of the bearings for said worm-shaft is secured to one of said piers. The lower end of said kiln or retort terminates at the inner end of the hood 8, which is mounted on a truck 9, which is adapted to travel on the tracks or ways 10, whereby the position of the hood may be changed with relation to the end of said kiln for any necessary purpose. The head or closed end of said hood is provided with an orifice $b$, through which the fuel-supply pipe 11 projects into the lower end of said retort, and an orifice (not shown) is formed in the front wall of the hood to enable inspection of the interior. An opening $a$ is also provided in the bottom of the hood for the purpose of discharging the contents of the rotary kiln. The upper end of said kiln, which is somewhat higher than the lower end thereof, projects into the base of the stack 12, the said end being open and in communication with a screw conveyer 13, the upper end of which projects through the base of the stack for the purpose of charging the kiln from the large hopper or bin 14, the said conveyer-shaft having a belt-pulley 15 on the outer end thereof to enable same to be power-driven. The hopper may be and is preferably formed as shown to enable the ready discharge of its contents or part thereof into the conveyer. It is provided with a track 16, whereon a car or cars 17 may travel, whereby the product to be nodulized and desulfurized may be quickly and readily charged into the bin 14, the bottom of the car being so constructed as to admit of its being readily opened to discharge its contents into the hopper. At the end of the kiln opposite to the conveyer is disposed an inclined endless elevator 18, which is adapted to carry the nodulized and desulfurized product to the cooling-tower 19, the contents of said conveyer 18 being discharged into said tower and cooled by a spray of water from the sprayer 20, which terminates the end of water-supply pipe 21. A car 22 is located below the cooling-tower in position to receive the cooled product. A tank 23 is supported or located upon the top of the stack-base and surrounds the stack 24, which tank is adapted to receive any hydrocarbon or carbohydrate compound of an adhesive nature and the heat from the stack and base thereof is sufficient to maintain such material fluid. A pipe 25, which is provided with a regulator 26, power-driven at a speed regulated by the amount of tar, pitch, or other adhesive hydrocarbon compounds or adhesive carbohydrate compounds used, leads from the tank to the inner end of the conveyer 13 and delivers the liquid hydrocarbon compounds or carbohydrate compounds in quantities desired into the kiln at the same time the material to be nodulized is also delivered.

I claim as my invention or discovery and desire to secure by Letters Patent—

1. The herein-described method or process for purifying and nodulizing finely-divided substances, which consists in adding thereto a binder, adhesive at low temperatures and capable of forming with the impurities volatile compounds at higher requisite temperatures, subjecting the material to heat, and agitating the material in any suitable manner to produce nodules.

2. The herein-described method or process for purifying and nodulizing finely-divided substances, which consists in adding thereto an adhesive substance, capable of binding the material at a low temperature, and of becoming volatile, and to aid in volatilizing the impurities, at a higher requisite temperature, subjecting the material to heat, and agitating the said material in any suitable manner to produce nodules.

3. The herein-described method or process for purifying and nodulizing finely-divided metalliferous material, which consists in adding thereto a binder, adhesive at low temperatures and capable of forming with the impurities volatile compounds at higher requisite temperatures, subjecting the material to heat, and agitating the material in any suitable manner to nodulize the same.

4. The herein-described method or process for purifying and nodulizing finely-divided metalliferous material, which consists in adding thereto an adhesive substance, capable of binding the material at a low temperature, and of becoming volatile, and to aid in volatilizing the impurities at a higher requisite temperature, subjecting the material to heat, and agitating the said material in any suitable manner to form nodules.

5. The herein-described method or process for purifying and nodulizing finely-divided substances, which consists in adding thereto a binder adhesive at low temperatures and capable of forming with the impurities volatile compounds at higher requisite temperatures, subjecting the material to heat, varying from approximately 1,200° Fahrenheit to above 2,000° Fahrenheit, and agitating the said material in any suitable manner to produce nodules.

6. The herein-described method or process for purifying and nodulizing finely-divided substances, which consists in adding thereto an adhesive substance, capable of binding the material at a low temperature, and of becoming volatile, and to aid in volatilizing the impurities at a higher requisite temperature, subjecting the material to heat, ranging from approximately 1,200° Fahrenheit to above 2,000° Fahrenheit, and agitating the said material in any suitable manner to form the same into nodules.

7. The herein-described method or process for purifying and nodulizing finely-divided metalliferous material, which consists in adding thereto a binder adhesive at a low temperature, and capable of becoming volatile, and to aid in volatilizing the impurities contained in said material at a higher requisite temperature, subjecting the material to heat varying or ranging from degrees or temperatures sufficient to volatilize the binder and impurities, to degrees or temperatures sufficient to bring about the desired degree of fusion, and agitating the material to produce nodules.

8. The herein-described method or process of producing nodules substantially free from impurities, and of substantially uniform size from finely-divided metalliferous material, which consists in adding to said material a binder adhesive at low temperatures and of a character capable of being itself removed and of aiding in the removal of the impurities contained in said material, when subjected to heat sufficient to volatilize said binder and impurities, then subjecting said material to varying degrees of heat, from approximately sufficient to volatilize and eliminate the said binder and impurities to sufficient to finally fuse said nodules into permanent form, and simultaneously therewith, agitating and progressively moving said material at the required rapidity, whereby said material is successively exposed to heat sufficient to volatilize and eliminate the said binder and impurities and size the nodules, and finally fuse said nodules into permanent form.

9. The herein-described method or process of producing nodules of any desired substantially uniform size from finely-divided metalliferous material which consists in adding thereto the requisite quantity of pitch to produce the required adhesiveness, then subjecting said material to varying degrees of heat from approximately sufficient to volatilize and eliminate said pitch and impurities, to sufficient to finally fuse the nodules into permanent form, and simultaneously therewith, agitating and progressively moving said material at the required rapidity, whereby said material is successively exposed to heat sufficient to volatilize and eliminate the pitch and impurities and give the requisite size to the nodules, and finally fuse said nodules into permanent form.

10. The herein-described method or process of purifying and nodulizing finely-divided metalliferous material, which consists in adding thereto pitch, then subjecting said material to varying degrees of heat, ranging from approximately 1,200° Fahrenheit, sufficient to volatilize and eliminate the pitch, to above 2,000° Fahrenheit, sufficient to partially fuse the nodules into permanent form, and simultaneously agitating the material in any suitable manner to produce nodules.

In testimony whereof I have hereunto signed my name in the presence of two subscribing witnesses.

TOM COBB KING.

In presence of—
JAMES C. HERRON,
CLARENCE A. WILLIAMS.